United States Patent
de Leon

(10) Patent No.: US 8,090,201 B2
(45) Date of Patent: Jan. 3, 2012

(54) IMAGE-BASED CODE

(75) Inventor: David de Leon, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1108 days.

(21) Appl. No.: 11/837,568

(22) Filed: Aug. 13, 2007

(65) Prior Publication Data

US 2009/0046929 A1    Feb. 19, 2009

(51) Int. Cl.
*G06K 9/34*    (2006.01)
*G06K 9/62*    (2006.01)

(52) U.S. Cl. .................................... 382/173; 382/209

(58) Field of Classification Search .............. 382/100, 382/115, 173, 209, 218, 305; 712/29; 713/182–185; 726/2, 3, 6, 17, 18
See application file for complete search history.

(56) References Cited

U.S. PATENT DOCUMENTS

| | | | |
|---|---|---|---|
| 5,821,933 A | 10/1998 | Keller et al. | |
| 6,209,104 B1 * | 3/2001 | Jalili | 726/18 |
| 6,980,081 B2 * | 12/2005 | Anderson | 340/5.53 |
| 7,219,368 B2 * | 5/2007 | Juels et al. | 726/2 |
| 7,644,433 B2 * | 1/2010 | Mizrah | 726/2 |
| 7,734,930 B2 * | 6/2010 | Kirovski et al. | 713/184 |
| 2006/0021024 A1 | 1/2006 | Park | |

FOREIGN PATENT DOCUMENTS

CA    2 495 450 A1    7/2006

OTHER PUBLICATIONS

Passfaces™; http://www.realuser.com/gadget/gadgetshow.html; copyright 2005-2007 Passfaces Corporation.
Passfaces™; http://www.realuser.com; copyright 2005-2007 Passfaces Corporation.
International Search Report and Written Opinion dated Jun. 25, 2008 issued in corresponding PCT application No. PCT/IB2008/050491, 11 pages.
State Intellectual Property Office of China; First Office Action; Sep. 26, 2011; issued in Chinese Patent Application No. 200880102107.X.

* cited by examiner

*Primary Examiner* — Yon Couso
(74) *Attorney, Agent, or Firm* — Sreenivas Vedantam; Moore & Van Allen, PLLC

(57) ABSTRACT

A computer-readable medium may include one or more instructions for providing sub-images, one or more instructions for receiving selection of a plurality of sub-images, one or more instructions for constructing a first image, the first image being a unified image including the selected plurality of sub-images, one or more instructions for comparing at the selected plurality of sub-images with previously selected sub-images, and one or more instructions for providing access to at least one of a device, a service, or a function when the selected plurality of sub-images match the previously selected sub-images.

22 Claims, 10 Drawing Sheets

IMAGE-BASED CODE

BACKGROUND

There are countless services, functions and devices that employ some form of password or personal identification number (PIN) for their use. Given the widespread utilization of these types of codes, most users have multiple codes that they have to remember. However, it is not uncommon among users to have difficulty recalling a code. While there are a variety of reasons why users suffer from this difficulty, it would be beneficial to provide users with an alternative approach.

SUMMARY

According to one aspect, a computer-readable medium may contain instructions executable by at least one processor. The computer-readable medium may include one or more instructions for providing sub-images, one or more instructions for receiving selection of a plurality of sub-images, one or more instructions for constructing a first image, the first image being a unified image including the selected plurality of sub-images, one or more instructions for comparing the selected plurality of sub-images with previously selected sub-images, and one or more instructions for providing access to at least one of a device, a service, or a function when the selected plurality of sub-images match the previously selected sub-images.

Additionally, the one or more instructions for providing sub-images may include one or more instructions for categorizing the sub-images.

Additionally, the selected plurality of sub-images may include at least one of two sub-images of a different category or at least one sub-image that is an animation.

Additionally, the one or more instructions for receiving selection may include one or more instructions for receiving selection of a character associated with the sub-image.

Additionally, each sub-image includes a corresponding character, and the unified image includes a first code comprising the characters.

Additionally, the one or more instruction for constructing may include one or more instructions for overlaying at least one of the selected plurality of sub-images onto at least one other of the selected plurality of sub-images.

Additionally, the selected plurality of sub-images may be segments of the first image, and the one or more instructions for constructing may include one or more instructions for assembling the selected plurality of sub-images to form the first image based on the segmentation of each sub-image.

Additionally, there may be at least one of the selected plurality of sub-images that has a plurality of corresponding characters.

Additionally, the sub-images may include sub-images relating to living things, non-living things, and places.

Additionally, the one or more instructions for constructing may include one or more instructions for overlaying the selected plurality of sub-images to corresponding specific regions on a scenic sub-image.

Additionally, the plurality of sub-images may include a plurality of characters, and the one or more instructions for constructing may include one or more instructions for displaying the corresponding sub-images as the plurality of characters are selected.

According to another aspect, a method may include providing sub-images having a plurality of categories, selecting a plurality of sub-images, constructing a first image that includes the selected plurality of sub-images, displaying the first image in a unified image, comparing information associated with the unified image with information associated with a previously constructed unified image, and providing access to at least one of a device, a service, or a function when the information associated with the unified image matches the information associated with the previously constructed unified image.

Additionally, the selecting may include selecting the plurality of sub-images having at least two sub-images of a different category.

Additionally, the method may include providing characters associated with the plurality of sub-images, and where the first image includes the selected plurality of sub-images and associated characters.

Additionally, the selecting may include selecting the plurality of sub-images based on characters associated with the plurality of sub-images.

Additionally, the constructing may include overlaying at least one of the selected plurality of sub-images onto another of the selected plurality of sub-images.

Additionally, the constructing may include constructing the first image based on the selected plurality of sub-images that correspond to segments of the first image, each segment including a sub-image and at least one character, and each segment having a specific region to occupy in the first image.

Additionally, the sub-images may include animation and video.

Additionally, the constructing may include dragging and dropping the selected sub-image in an unoccupied region of the first image to be constructed.

According to yet another aspect, a device may include a memory to store instructions, and a processor to execute the instructions to receive selection of a plurality of sub-images and characters, construct a first image that includes the selected plurality of sub-images and a first code that includes the selected characters, compare the received selections with previously stored selections associated with an image and a code, and provide access to a function or a service of the device when the received selections match the previously stored selections.

Additionally, the device may include a display, and the processor may execute instructions to display the first image and the first code in a unified image on the display.

According to still another aspect, a device may include means for providing sub-images having different categories, means for receiving selection of a plurality of sub-images, means for constructing a first image that includes the selected plurality of sub-images, means for displaying the first image in a unified image, means for comparing the selections with previously stored selections, and means for providing access to a function or a service of the device when the selections match the previously stored selections.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following description does not limit the invention. The terms image and sub-image, as used herein, are intended to be broadly interpreted to include any representation of graphical information (e.g., a picture, a video, an animation, etc.). The term code, as used herein, is intended to be broadly interpreted to include any character string (e.g., letters, numbers, alphanumeric sequence, symbols, etc.). The term character, as used herein, is intended to be broadly interpreted to include any letter, number, or symbol.

Overview

Figure 1:
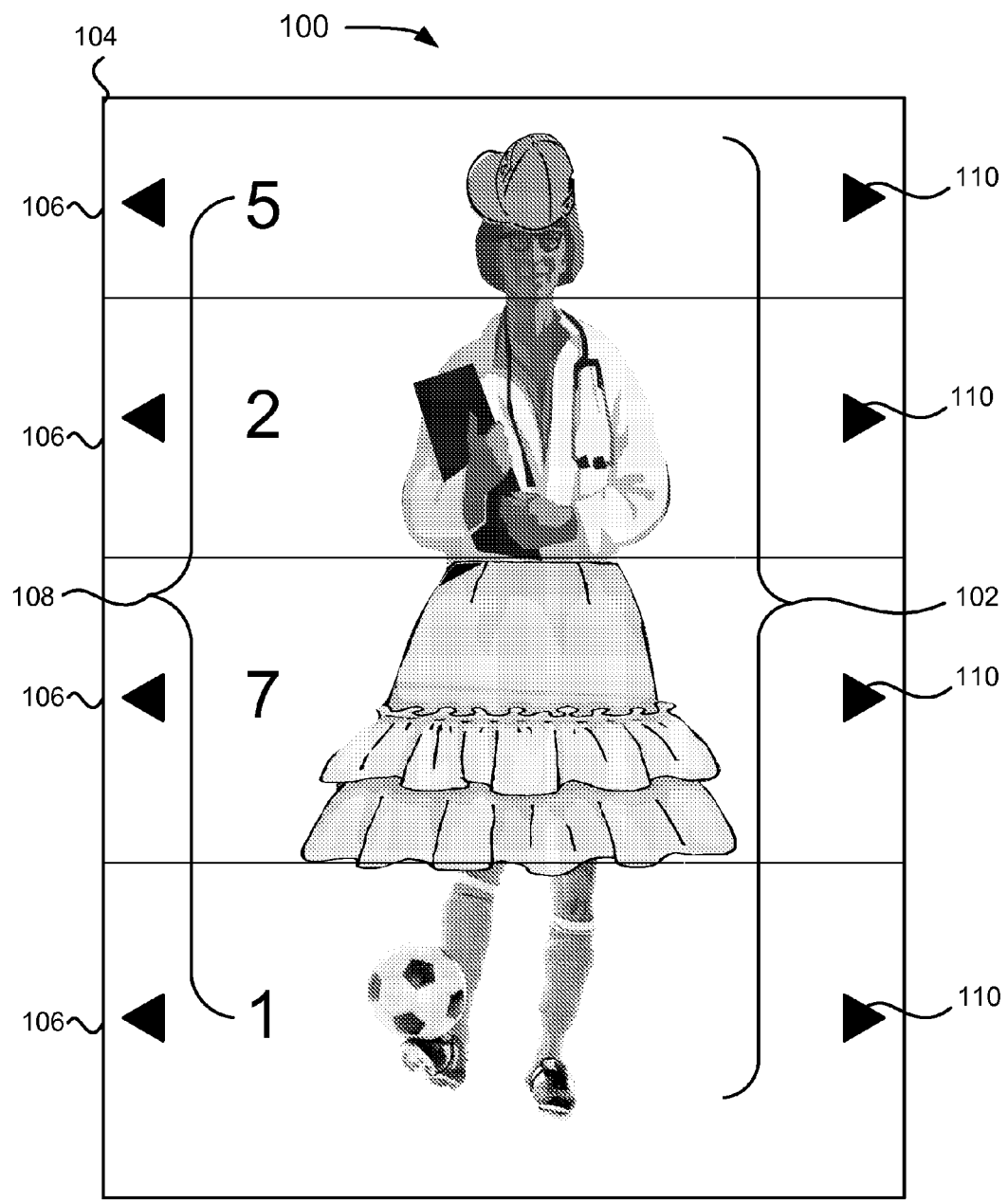
FIG. 1 is a diagram illustrating a concept described herein.

Implementations described herein may provide an image-based code. FIG. 1 is a diagram illustrating a concept 100 as described herein. As illustrated, a device may include a display 104 and logic that provides for the design and/or use of an image-based code. For example, an image 102 may be displayed on display 104 of the device. Image 102 may be divided into segments 106. Each segment 106 may include a sub-image of image 102 and a corresponding sub-character of code 108. A user may construct image 102 by choosing from an array of segments 106 using a tab 110. For example, a user may select tab 110 and change the top portion of the image (i.e., a sub-image of a woman's head wearing a baseball cap) to another sub-image (e.g., a man's head wearing a fireman's helmet (not illustrated)). A user may construct a unified image based on the selected segments.

The user's selection of the predetermined "correct" image 102 and/or code 108 may be used as a basis for security functions for device. For example, the device may require correct selection of image 102 and/or code 108 before the device will allow access to itself.

As will be described herein, numerous variations to FIG. 1 may be employed. For example, instead of the image being segmented, the image may include a layering of sub-images. Additionally, or alternatively, a sub-image may include animation and/or video. Additionally, or alternatively, a user may select a character of a code to display a sub-image. Still further, additional variations will be described below.

A sub-image may be of any type, such as living things, non-living things, places, etc. However, a user may construct a unique, single image based on a plurality of sub-images that may be more memorable compared to a code. In addition, a user may still be provided with a corresponding code of the image that the user may remember.

Exemplary Device

Figure 2:
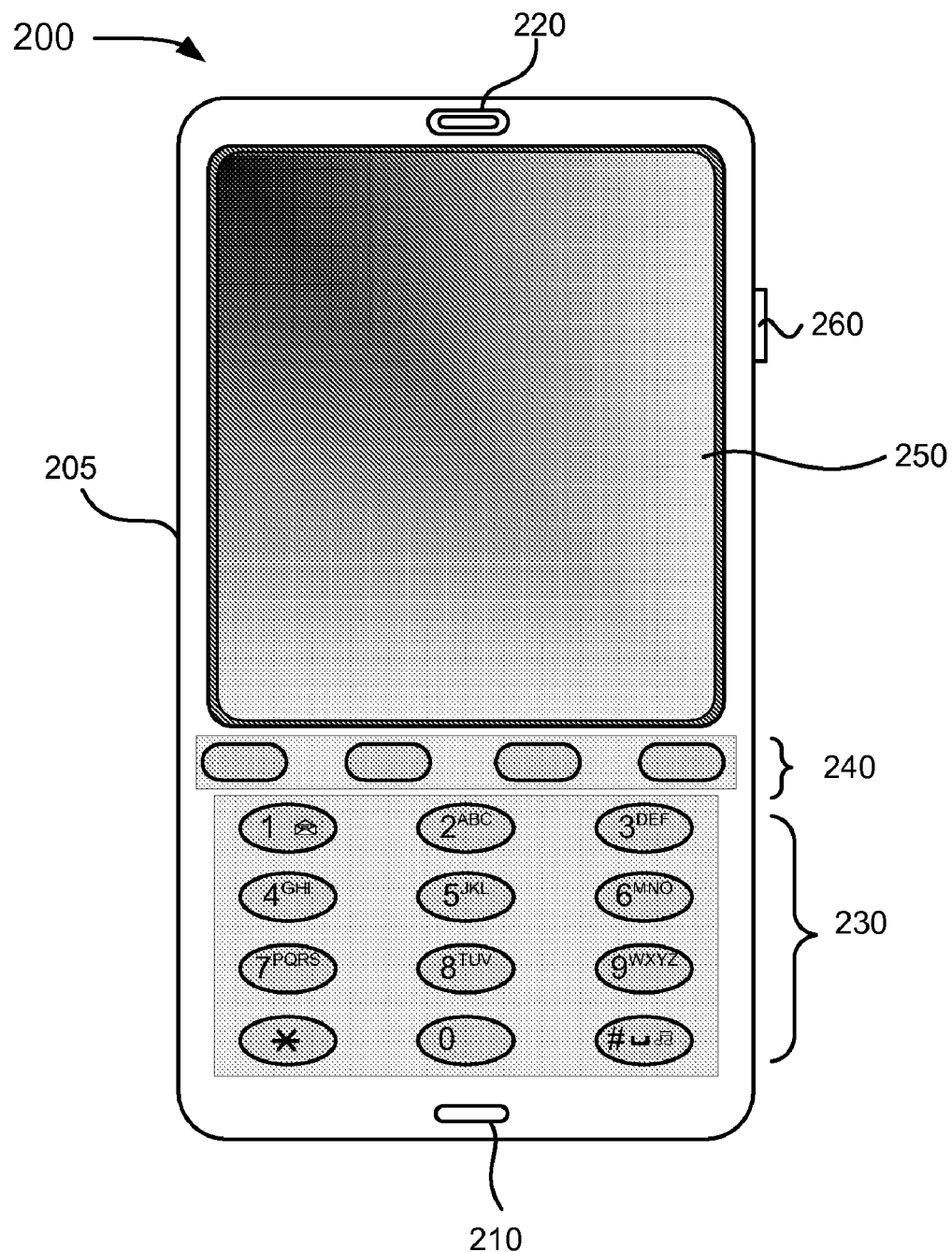
FIG. 2 is a diagram illustrating a front view of exemplary external components of an exemplary device having image-based code capability.

FIG. 2 is a diagram illustrating a front view of exemplary external components of an exemplary device having image-based code capability. As illustrated, device 200 may include a housing 205, a microphone 210, a speaker 220, a keypad 230, function keys 240, a display 250, and a camera button 260. The terms device and component, as used herein, is intended to be broadly interpreted to include hardware, software, and/or a combination of hardware and software.

Housing 205 may include a structure configured to contain components of device 200. For example, housing 205 may be formed from plastic and may be configured to support microphone 210, speaker 220, keypad 230, function keys 240, display 250, and camera button 260.

Microphone 210 may include any component capable of transducing air pressure waves to a corresponding electrical signal. For example, a user may speak into microphone 210 during a telephone call. Speaker 220 may include any component capable of transducing an electrical signal to a corresponding sound wave. For example, a user may listen to music through speaker 220.

Keypad 230 may include any component capable of providing input to device 200. Keypad 230 may include a standard telephone keypad. Keypad 230 may also include one or more special purpose keys. In one implementation, each key of keypad 230 may be, for example, a pushbutton. A user may utilize keypad 230 for entering information, such as text or a phone number, or activating a special function.

Function keys 240 may include any component capable of providing input to device 200. Function keys 240 may include a key that permits a user to cause device 200 to perform one or more operations. The functionality associated with a key of function keys 240 may change depending on the mode of device 200. For example, function keys 240 may perform a variety of operations, such as placing a telephone call, playing various media, setting various camera features (e.g., focus, zoom, etc.) or accessing an application. Function keys 240 may include a key that provides a cursor function and a select function. In one implementation, each key of function keys 240 may be, for example, a pushbutton.

Display 250 may include any component capable of providing visual information. For example, in one implementation, display 250 may be a liquid crystal display (LCD). In another implementation, display 250 may be any one of other display technologies, such as a plasma display panel (PDP), a field emission display (FED), a thin film transistor (TFT) display, etc. Display 250 may be utilized to display, for example, text, image, and/or video information. Display 250 may also operate as a view finder, as will be described later. Camera button 260 may be a pushbutton that enables a user to take an image.

Device 200 is exemplary; device 200 is intended to be broadly interpreted to include any type of electronic device where an image-based code may be utilized. For example, device 200 may include a communication device, such as a wireless telephone or a personal digital assistant (PDA), a computational device, such as a computer, an entertainment device, such as a game system, a stationary device, such as a security system, or any other type of device that includes a display in which an image-based code may be utilized. Accordingly, although FIG. 2 illustrates exemplary external components of device 200, in other implementations, device 200 may contain fewer, different, or additional external components than the external components depicted in FIG. 2. Additionally, or alternatively, one or more external components of device 200 may include the capabilities of one or more other external components of device 200. For example, display 250 may be an input component (e.g., a touch screen).

Additionally, or alternatively, the external components may be arranged differently than the external components depicted in FIG. 2.

In other instances, a user may access a function or service via a network (e.g., the Internet, a private network, a wireless network, a television network, etc.) where an image-based code may be utilized. For example, a user may visit a Web server to gain access to a credit card account, a banking account, an e-mail account, a video rental service account, etc. based on an image-based code. Accordingly, the concept described herein may be applied to various platforms and schemes.

Figure 3:
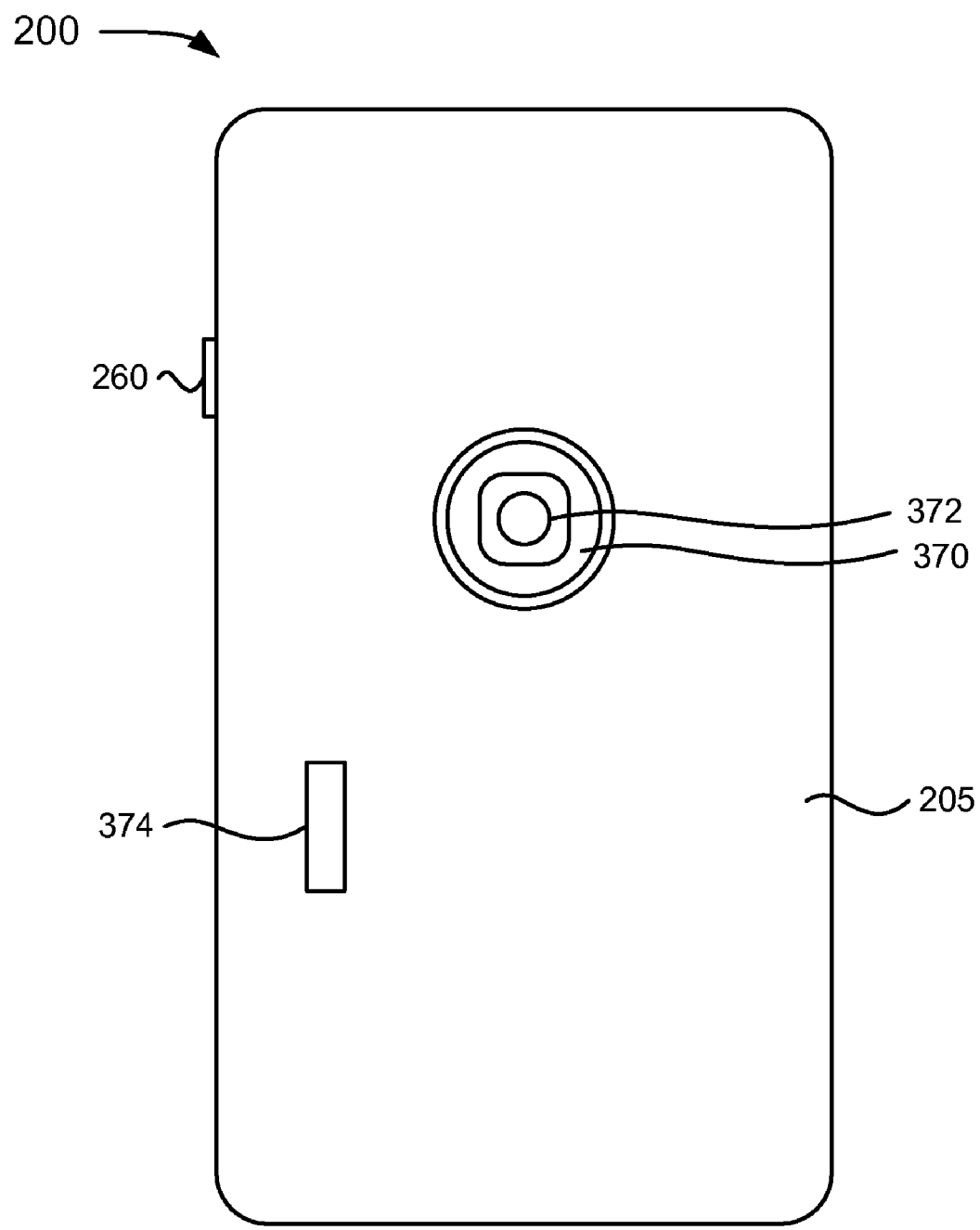
FIG. 3 is a diagram illustrating a rear view of exemplary external components of the device depicted in FIG. 2.

FIG. 3 is a diagram illustrating a rear view of exemplary external components of the device depicted in FIG. 2. As illustrated, in addition to the components previously described, device 200 may include a camera 370, a lens assembly 372, and a flash 374.

Camera 370 may include any component capable of capturing an image. Camera 370 may be a digital camera. Display 250 may operate as a view finder when a user of device 200 operates camera 370. Camera 370 may provide for automatic and/or manual adjustment of a camera setting. In one implementation, device 200 may include camera software that is displayable on display 250 to allow a user to adjust a camera setting. For example, a user may be able adjust a camera setting by operating function keys 240.

Lens assembly 372 may include any component capable of manipulating light so that an image may be captured. Lens assembly 372 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. In one implementation, lens assembly 372 may be permanently fixed to camera 370. Lens assembly 372 may provide for a variable aperture size (e.g., adjustable f-number).

Flash 374 may include any type of light-emitting component to provide illumination when camera 370 captures an image. For example, flash 374 may be a light-emitting diode (LED) flash (e.g., white LED) or a xenon flash.

Although FIG. 3 illustrates exemplary external components, in other implementations, device 200 may include fewer, additional, and/or different components than the exemplary external components depicted in FIG. 3. For example, device 200 may not include camera 370 and other components associated therewith. In still other implementations, one or more external components of device 200 may be arranged differently.

Figure 4:
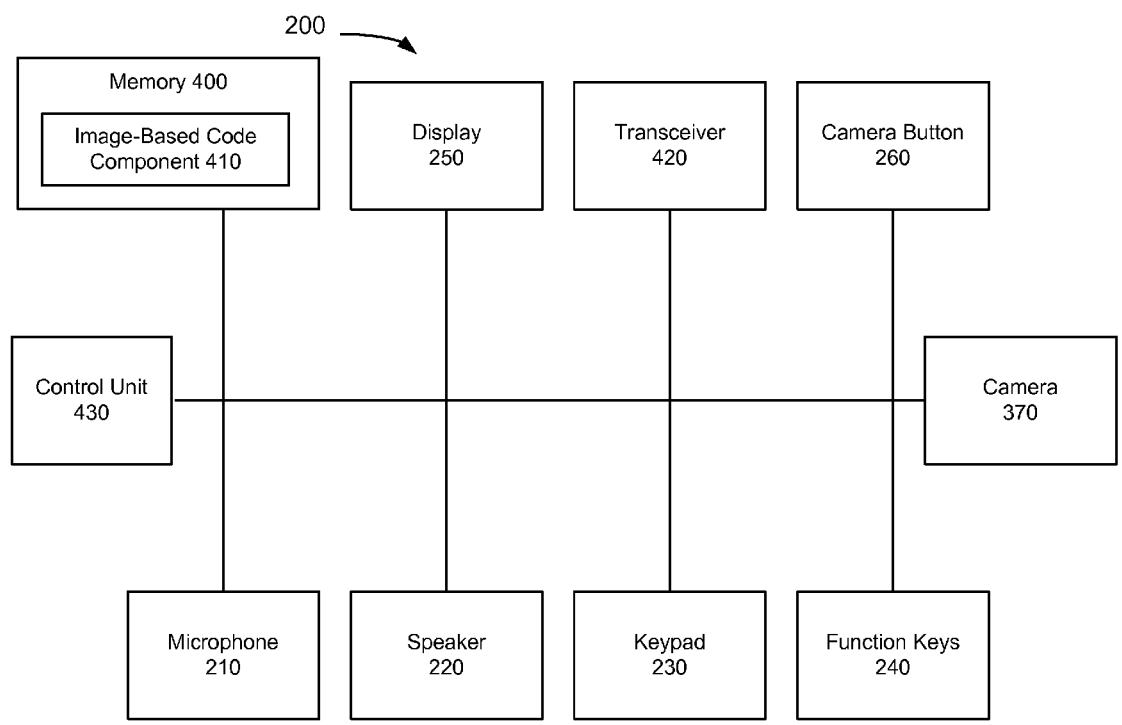
FIG. 4 is a diagram illustrating exemplary internal components of the device depicted in FIG. 2.

FIG. 4 is a diagram illustrating exemplary internal components of the device depicted in FIG. 2. As illustrated, device 200 may include microphone 210, speaker 220, keypad 230, function keys 240, display 250, camera button 260, camera 370, a memory 400, a transceiver 420, and a control unit 430. No further description of microphone 210, speaker 220, keypad 230, function keys 240, display 250, camera button 260, and camera 370 is provided with respect to FIG. 4.

Memory 400 may include any type of storing component to store data and instructions related to the operation and use of device 200. For example, memory 400 may include a memory component, such as a random access memory (RAM), a read only memory (ROM), and/or a programmable read only memory (PROM). Additionally, memory 400 may include a storage component, such as a magnetic storage component (e.g., a hard drive) or other type of computer-readable medium. Memory 400 may also include an external storing component, such as a Universal Serial Bus (USB) memory stick, a digital camera memory card, and/or a Subscriber Identity Module (SIM) card.

Memory 400 may include an image-based code component 410. Image-based code component 410 may include instructions to cause device 200 to provide image-based code capability as described herein. Image-based code component 410 will be described in greater detail below.

Transceiver 420 may include any component capable of transmitting and receiving information. For example, transceiver 420 may include a radio circuit that provides wireless communication with a network or another device.

Control unit 430 may include any logic that may interpret and execute instructions, and may control the overall operation of device 200. Logic, as used herein, may include hardware, software, and/or a combination of hardware and software. Control unit 430 may include, for example, a general-purpose processor, a microprocessor, a data processor, a co-processor, and/or a network processor. Control unit 430 may access instructions from memory 400, from other components of device 200, and/or from a source external to device 200 (e.g., a network or another device).

Control unit 430 may provide for different operational modes associated with device 200. Additionally, control unit 430 may operate in multiple modes simultaneously. For example, control unit 430 may operate in a camera mode, a walkman mode, and/or a telephone mode. In one implementation, a user may prevent access of device 200 by employing an image-based code. The image-based capability of device 200 will be described in greater detail below.

Although FIG. 4 illustrates exemplary internal components, in other implementations, device 200 may include fewer, additional, and/or different components than the exemplary internal components depicted in FIG. 4. For example, in one implementation, device 200 may not include transceiver 420. In still other implementations, one or more internal components of device 200 may include the capabilities of one or more other components of device 200. For example, transceiver 420 and/or control unit 210 may include their own on-board memory 400.

Figure 5:
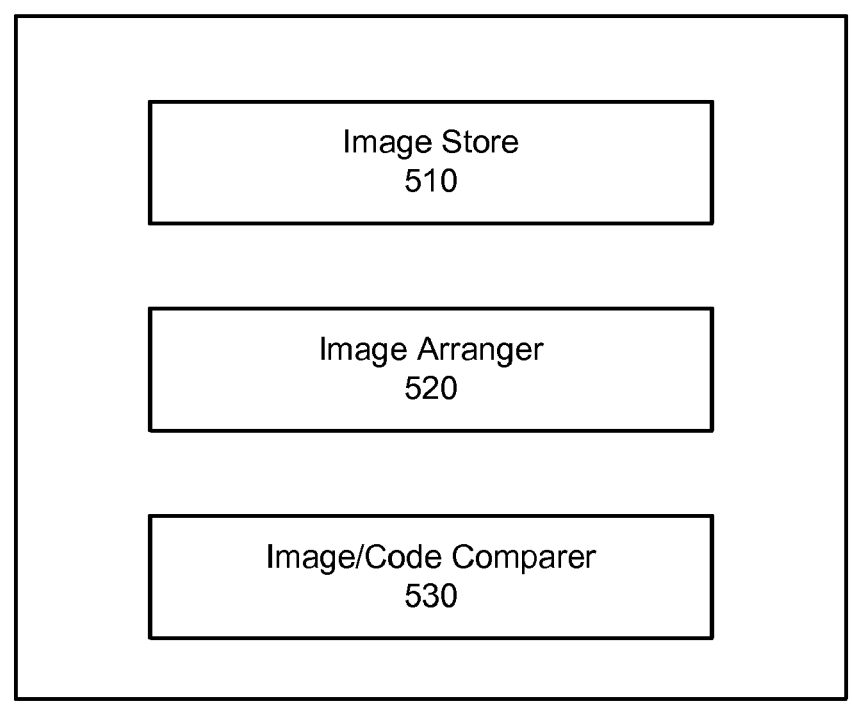
FIG. 5 is a diagram of the exemplary image-based code module depicted in FIG. 4.

FIG. 5 is a diagram of the exemplary image-based code component depicted in FIG. 4. Image-based code component 410 may include an image store 510, an image arranger 520, and an image/code comparer 530. Although not illustrated, image-based code component 410 may include a graphical user interface (GUI). The GUI may include various graphical interfaces, such as icons, menus, tabs, drag-and-drop interface, etc. to permit the design and selection of an image/code pair.

Image store 510 may allow a user to display various sub-images, such as living objects (e.g., people, animals, plants, etc.) or non-living objects (e.g., places, things, etc.) and characters.

Each of the sub-images may co-exist with one or more characters. In one implementation, a sub-image/character pair may be fixed. For example, as illustrated in FIG. 1, one of the sub-mage/character pairs is a woman's head with a baseball cap (sub-image) and the number five (character). In this instance, image store 510 may not allow, for example, the number five to be changed to a different number because the sub-image/character pair (i.e., the woman's head with a baseball cap and the number five) is a fixed sub-image character/pair. In other implementations, however, image store 510 may provide for the customization of sub-image/character pairs. For example, image store 510 may provide a GUI to change, for example, one sub-image/character pair to a new and different sub-image/character pair. In this way, a user may design a sub-image/character pair that includes, perhaps, a favorite sub-image with a favorite character (e.g., lucky number).

Image store 510 may also allow a user to import sub-images. For example, the GUI may import a sub-image from a resource external to device 200, such as the Internet, or from a resource internal to device 200, such as memory 400. For example, an image captured by camera 370 and stored in memory 400 may be added to the image store 510. Additionally, or alternatively, image store 510 may provide a GUI to import new characters. For example, a user may import unique symbols (e.g., Chinese characters or abstract symbols) to be associated with a sub-image.

Image store 510 may also allow a user to create a sub-image and/or a character. For example, image store 510 may provide tools (e.g., drawing tools, painting tools, etc.) to create a sub-image and/or a character. Image store 510 may also provide a GUI to manage the size, shape and/or orientation of an imported sub-image so that the sub-image may be utilized to form an image.

Image arranger 520 may the user to construct an image and a code based on the sub-images and the characters from image store 510. That is, a user may construct a unified image based on the sub-images. Described below are two exemplary implementations that may be employed to construct an image and a code; however, other implementations may be realized.

In a first implementation, an image/code pair may include a plurality of segments, where each segment includes at least a sub-image and a corresponding character. The GUI of image arranger 520 may include, for example, tabs, such as tabs 110, to select a segment, or may include a drag-and-drop interface to select a segment.

The segmentation of the image/code pair may or may not be uniform. For example, each segment of the image/code pair may or may not be of similar size, shape and/or orientation. Additionally, or alternatively, each segment of the image/code pair may or may not differ in contribution to the overall image and/or code. That is, for an image/code pair, one segment may include a sub-image that contributes to fifty percent of the image, and may contribute three characters of a six character code. Conversely, one segment may include a sub-image that contributes to ten percent of the image, and may contribute one character of a five character code.

Additionally, or alternatively, the image/code pair may not be completely segmented. For example, an image/code pair may include an initial, static sub-image with no corresponding character, and the remaining portion of the image and the code may be constructed based on segments having a sub-image and a character.

In a second implementation, an image/code pair may be configured as a layering of sub-images having coexisting characters. For example, image-based code component 410 may include a GUI that provides selection of a base sub-image, such as a scenic sub-image (e.g., a jungle, outer space, a room in a house, underwater in an ocean, etc.) and various sub-images to overlay (e.g., by drag-and-drop) on the scenic sub-image. The selection of overlay sub-images may range from an overlay sub-image (e.g., a space ship or an exotic animal) that relates to the scenic sub-image (e.g., outer space or jungle), to an overlay sub-image (e.g., baseball bat or washing machine) that is relatively unrelated to the scenic sub-image (e.g., outer space or jungle). In one implementation, the overlay sub-images may be dispersed in various regions of the base sub-image. Additionally, or alternatively, a base sub-image (e.g., an abstract image, such as a colored circle) may provide for overlaying multiple overlay sub-images (e.g., concentric circles of different colors) in one region.

In one implementation, a region for an overlay sub-image may be fixed. For example, a base sub-image may include specific regions that accept an overlay sub-image. In one implementation, for example, as a specific region is occupied, the next region to accept an overlay sub-image may be highlighted. In one implementation, the specific regions to be occupied may have a particular order, while in other implementations the specific regions to be occupied may not have a particular order.

Additionally, or alternatively, a base sub-image may not include specific regions to be occupied. That is, an overlay sub-image may be placed anywhere on the base sub-image. In one implementation, the order in which the overlay sub-image is placed with respect to the base sub-image may change the order of the corresponding code. For example, a scenic sub-image (e.g., a jungle "X") may include three animals (e.g., a lion "5", a giraffe "4", and a snake "H"). When the order of overlaying the overlay sub-images is lion, snake, and giraffe, the code may be "X5H4"; however when the order of placing the overlay sub-images is snake, lion, and giraffe, the code may be "XH54". Thus, although the image may be same (i.e., the image contains the same animals with corresponding characters and may have been placed in the same regions), the code may be different.

Image/Code comparer 530 may include a component to compare one image-based code to another image-based code. For example, image/code comparer 530 may compare an image-based code previously stored in memory 400 to an image-based code entered by a user when trying to use device 200. Image/Code comparer 530 may compare an image, a sub-image, a character, a code and/or information (e.g., identifiers) associated therewith of the image-based code stored in memory 400 with an image, a sub-image, a character, a code and/or information (e.g., identifiers) associated therewith of the image-based code entered.

In one implementation, image/code comparer 530 may provide, for example, an indication (e.g., a visual or an auditory cue) corresponding to the result of the comparison. Additionally, or alternatively, for example, image/code comparer 530 may not provide any indication of the result; rather, device 200 will permit access or will not permit access depending on the result of the comparison.

Although FIG. 5 illustrates exemplary components to provide the image-based code capability as described herein, in other implementations, device 200 may include fewer, different, or additional components than the exemplary components depicted in FIG. 5. As described above, image-based code component 410 may provide various functional capabilities for designing and employing an image-based code with, for example, device 200. However, in other applications, for example, a Web server employing image-based code component 410 for accessing a bank account, some of the functions described above may or may not be provided. For example, in such an instance, image-based code component 410 may not provide for importing sub-images and/or characters, or altering a sub-image/character pair.

Figure 6:
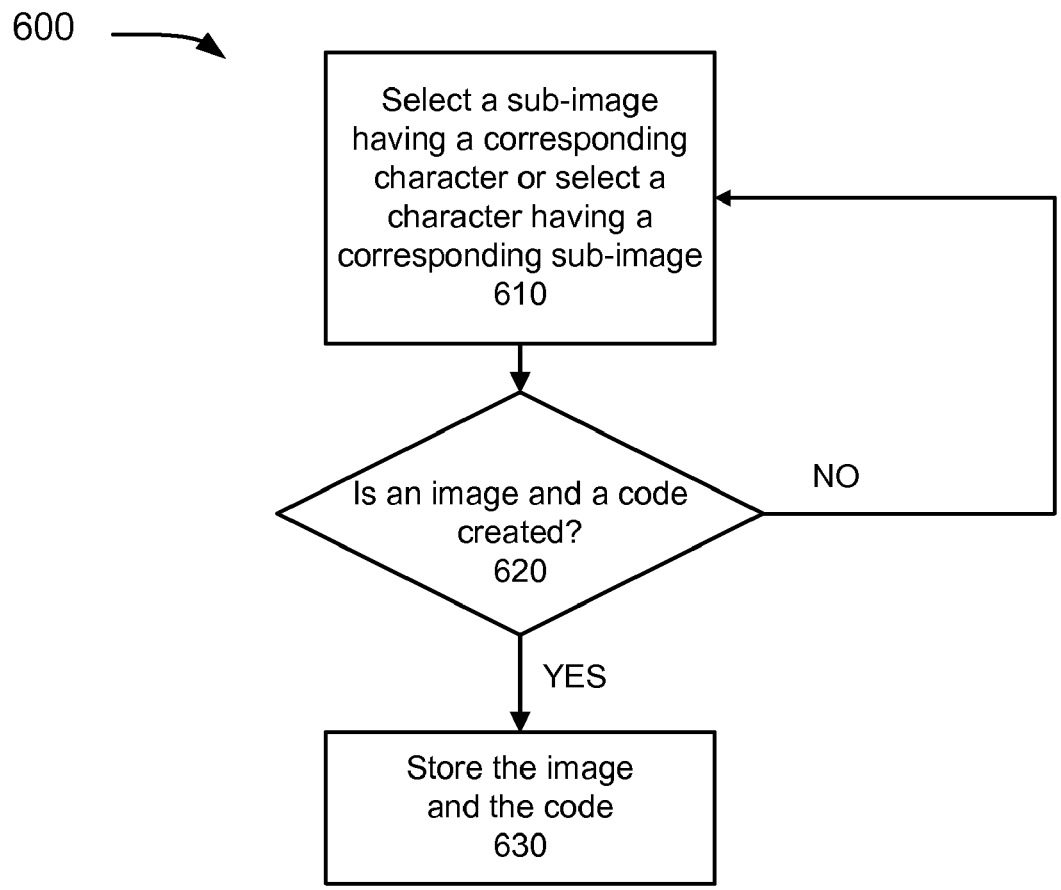
FIG. 6 is a flow diagram illustrating exemplary operations for designing an image-based code.

FIG. 6 is a flow diagram illustrating exemplary operations for designing an image-based code. Process 600 may begin with a selection of a sub-image having a corresponding character, or a selection of a character having a corresponding sub-image (Block 610). Image-based code component 410 may provide a GUI on display 250. The GUI may provide for the selection of a sub-image and a corresponding character. In other instances, a character may be entered from keypad 230 and the corresponding sub-image may be displayed on display 250. As mentioned above, the GUI of image-based code component 410 may include, for example, various menus, icons, tabs, drag-and-drop interface, etc. to permit selection of a sub-image and/or character.

In Block 620, image-based code component 410 may determine whether an image/code pair is created. For example, image-based code component 410 may determine whether the number of sub-images or characters is insufficient or whether certain sub-image regions are unoccupied. If an image/code pair is not created (Block 620—NO), then additional selections may be needed to complete an image/code pair. When an image/code pair is created (Block 620—YES), the image/code pair may be stored in memory 400 (Block 630).

Figure 7:
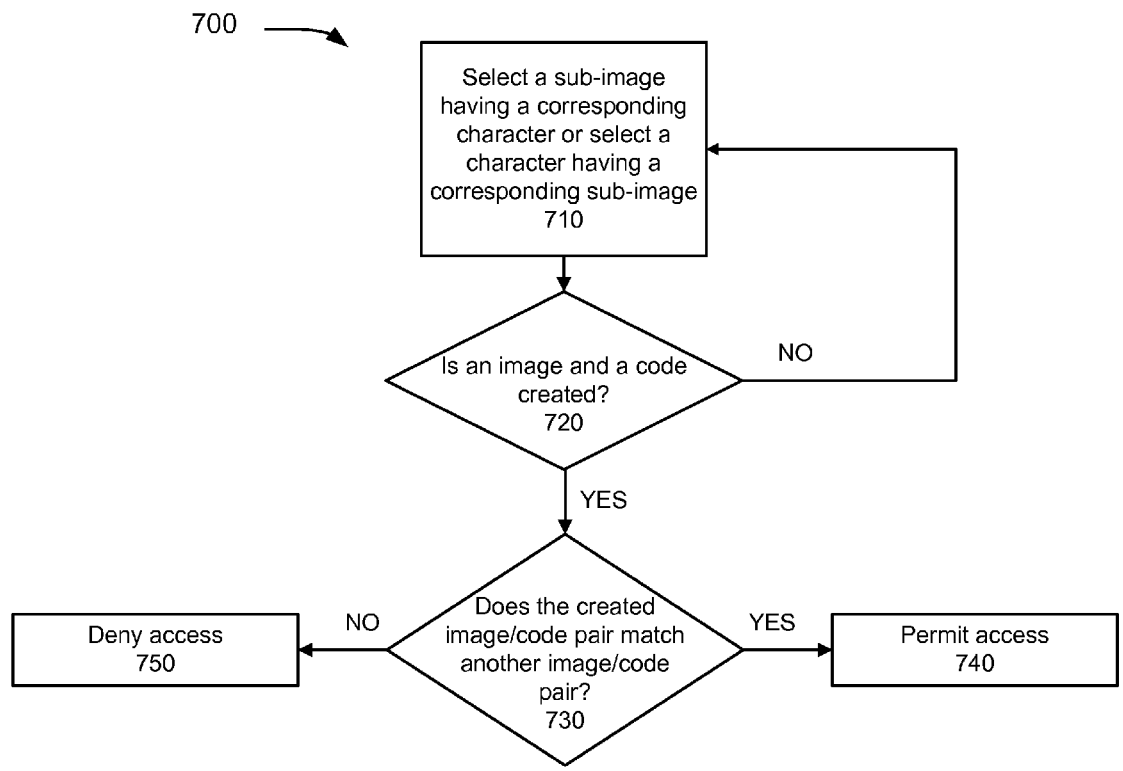
FIG. 7 is a flow diagram illustrating exemplary operations for providing image-based code to access a device, a service or a function.

FIG. 7 is a flow diagram illustrating exemplary operations for providing image-based code access to a device, such as device 200. Process 700 may begin with a selection of a sub-image having a corresponding character, or a selection of a character having a corresponding sub-image (Block 710). Image-based code component 410 may provide a GUI on display 250. The GUI may provide for the selection of a sub-image and a corresponding character. In other instances, a character may be entered from keypad 230 and the corresponding sub-image may be displayed on display 250. As mentioned above, the GUI of image-based code component 510 may include, for example, various menus, icons, tabs, drag-and-drop interface, etc., to permit selection of a sub-image and/or a character.

In Block 720, image-based code component 410 may determine whether an image/code pair is created. For example, image-based code component 410 may determine whether the number of sub-images or characters is insufficient, or whether certain sub-image regions are unoccupied. If an image/code pair is not created (Block 720—NO), then additional selections may be needed to complete an image/code pair. When an image/code pair is created (Block 720—YES), image-based code component 410 may compare the entered image/code pair with another image/code pair to determine whether a match exists (Block 730). For example, image-based code component 410 may make a comparison with an image/code pair stored in memory 400. When the comparison is successful (Block 730—YES), access to device 200 may be granted (Block 740); however, when the comparison is not successful (Block 730—NO), access to device 200 may be denied (Block 750).

EXAMPLES

Figure 8:
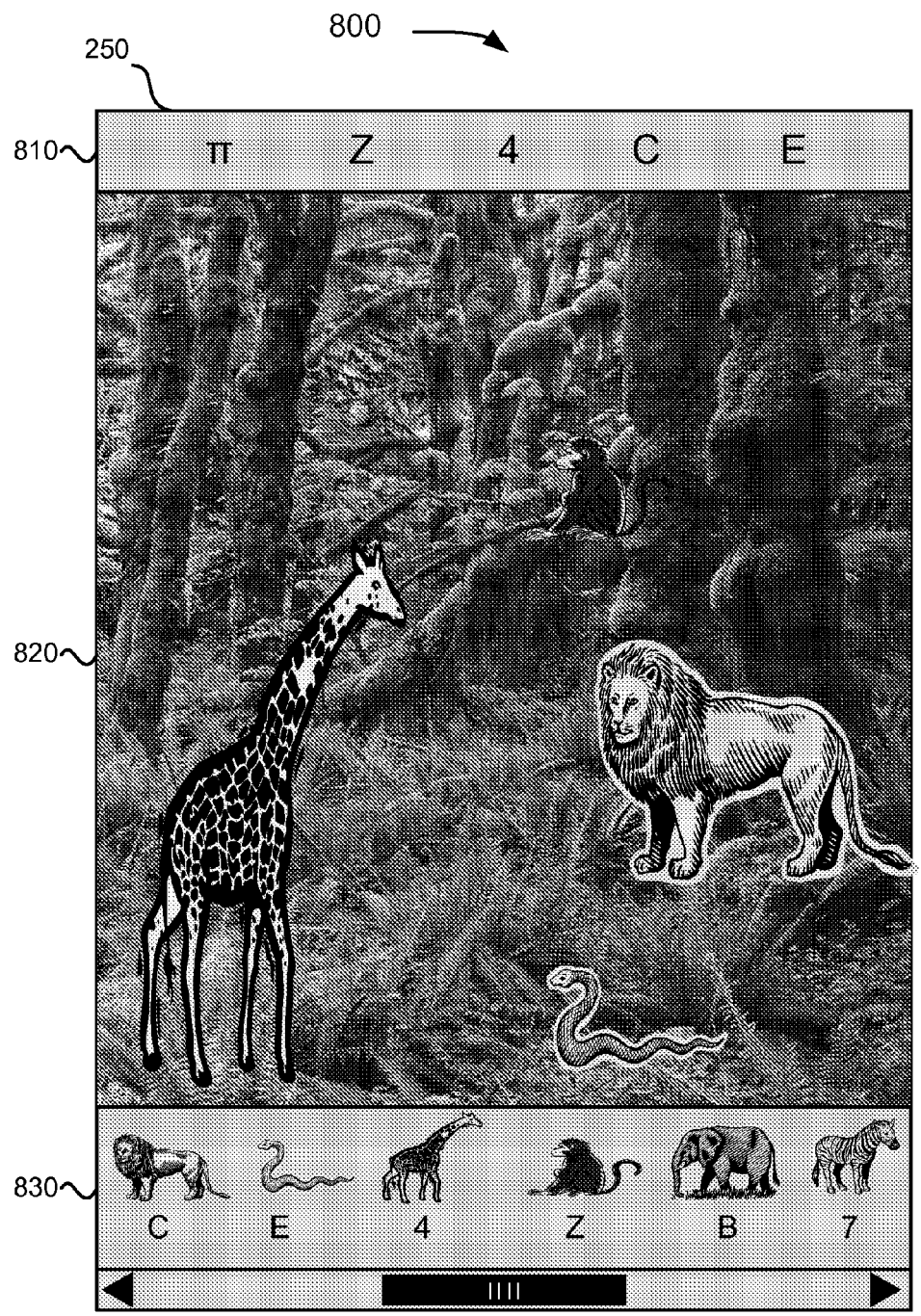
FIGS. 8-10 are diagrams illustrating exemplary screenshots for providing an image-based code.
Figure 9:
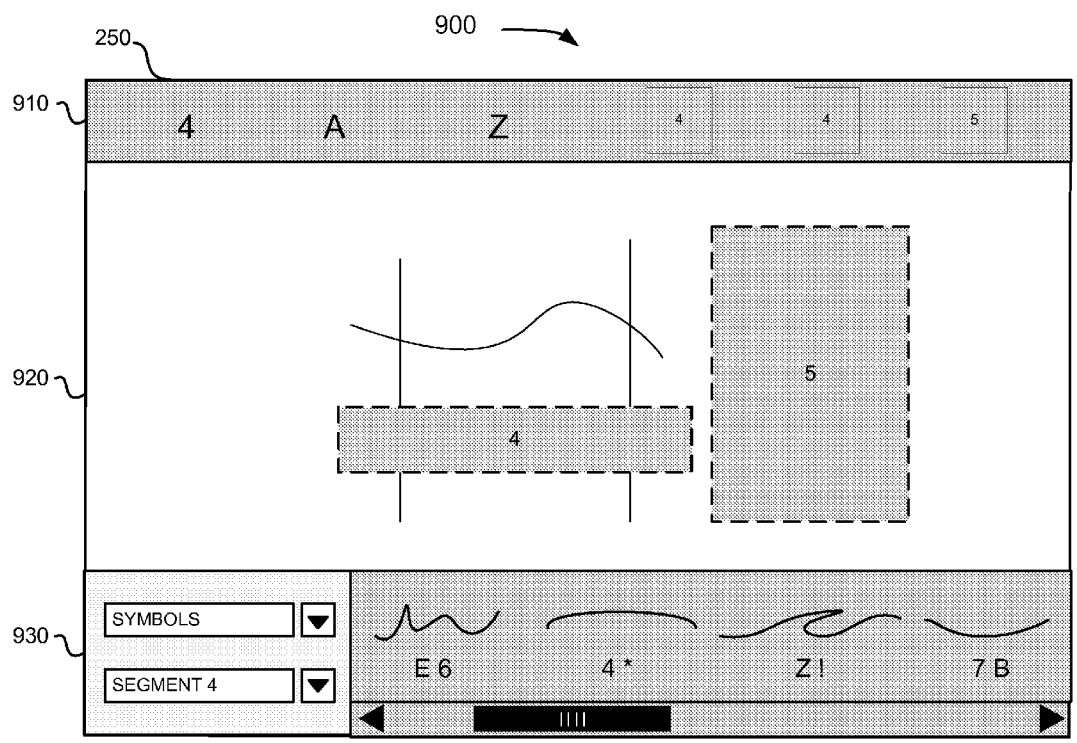
Figure 10:
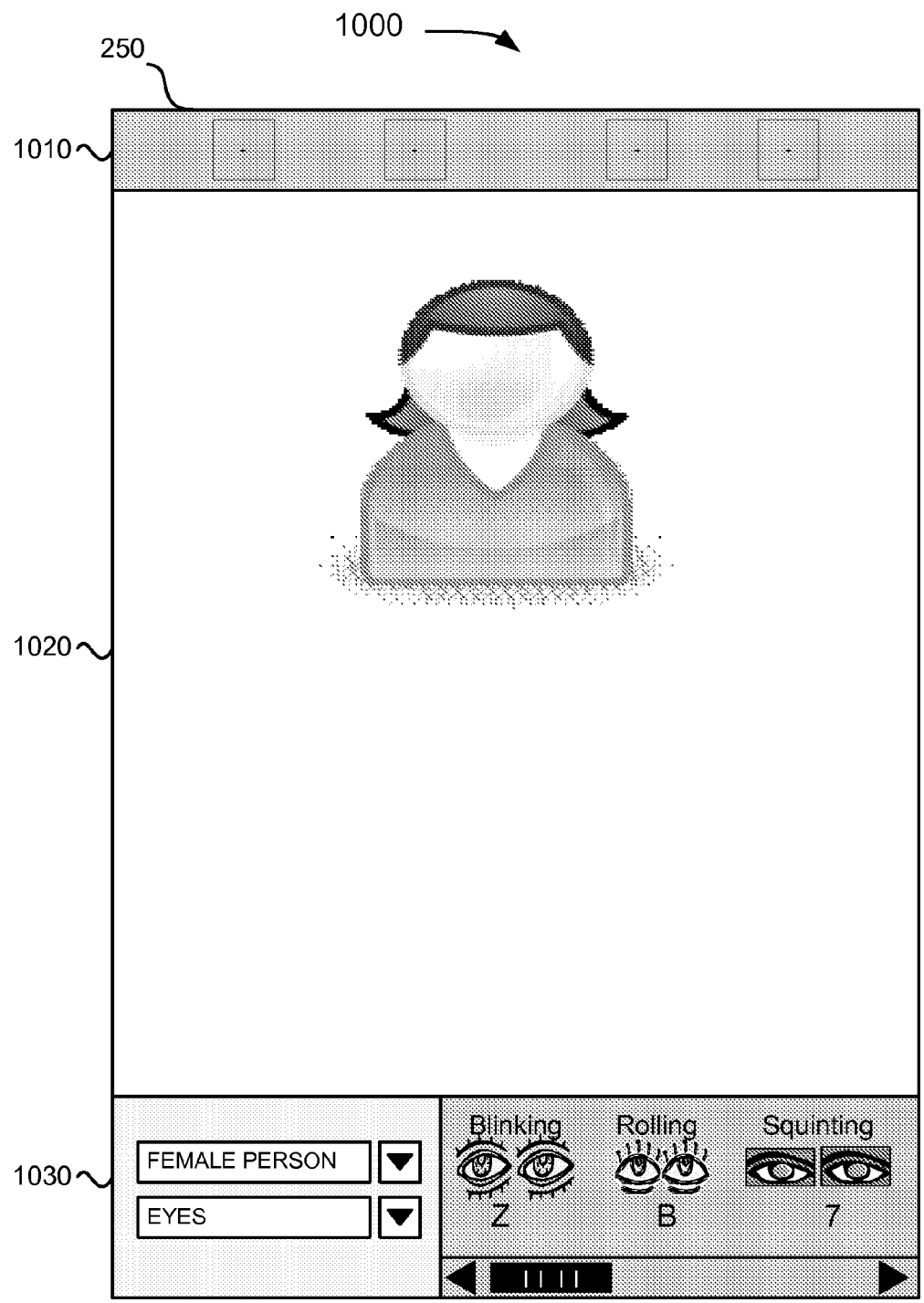

FIGS. 8-10 are diagrams illustrating exemplary screenshots for providing an image-based code. The description below omits discussion relating to a user's selection of, for example, various menus, prompts, and/or graphical links to arrive at the screenshots depicted in FIGS. 8-10. As illustrated, each screenshot is displayed on display 250 of device 200.

FIG. 8 is a diagram illustrating an image/code pair based on layering of sub-images. In this example, the GUI of image-based code component 410 includes a code region 810, an image region 820, and a sub-image selector region 830. Code region 810 indicates the corresponding characters of the sub-images in image region 820. Sub-image selector region 830 provides a GUI component to select various sub-images.

For example, image region 820 includes a base sub-image, such as a jungle, with a corresponding character of π (pi). Various sub-images may be placed on the scenic sub-image using, for example, drag-and-drop. For example, a user may drag the sub-image of the monkey onto the sub-image of the jungle, and the letter Z may appear in the code region 810. Next, the user may drag the sub-image of the giraffe onto the sub-image of the jungle, and the number four may appear in the code region 810. Subsequently, the user may drag the lion and the snake to image region 820 and the corresponding letters C and # may appear in the code region 810. In this example, the scenic sub-image does not include any specific regions where an overlay sub-image may be placed. However, in other implementations, a base image may include specific regions where a sub-image may be placed.

FIG. 9 is a diagram illustrating a partial image/code pair based on segmentation. In this example, the GUI of image-based code component 410 includes a code region 910, an image region 920, and a sub-image selector region 930. As illustrated, code region 910 include three characters corresponding to the three strokes in image region 920, and three unoccupied character regions numbered four and five. Image region 920 includes two unoccupied segment regions numbered four and five. The size and orientation of each unoccupied segment region is different, and each unoccupied segment region is highlighted. Unoccupied segment region four has two corresponding characters, while unoccupied segment region five has one corresponding character.

Sub-image selector region 930 includes a pull-down menu to select the type of image to be constructed. In this example, the image to be constructed is of a symbol. So, for example, a user may select the category of the image to be designed and/or entered by using the pull-down menu in sub-image selector region 930. Additionally, a pull-down menu indicates the next segment to be occupied. Sub-image selector 930 may automatically provide sub-images that correspond with the size, shape, and orientation of, for example, the next unoccupied segment. So, for example, when a user selects symbol as a category of the image to be designed and/or entered, the pull-down menu may indicate segment one, and sub-image selector 930 may automatically provide sub-images that correspond with the first segment to be occupied. A user may select a sub-image and drag the sub-image into image region 920 and the corresponding code, such as the number 4 may appear in code region 910.

As illustrated in FIG. 9, a user may have already selected sub-image/character pairs for segments one, two and three. Segment four appears in the pull-down menu of sub-image selector 930, and unoccupied segment four may be highlighted as the next unoccupied segment in image region 920. However, any segment may be selected using the pull-down menu. For example, if a user selects an incorrect sub-image/character pair, the user may re-select a different sub-image/character pair.

FIG. 10 is a diagram illustrating a partial image/code pair based on segmentation and layering. In this example, the GUI of image-based code component 410 includes a code region 1010, an image region 1020, and a sub-image selector region 1030. In this example, image region 1020 includes a static sub-image (i.e., a female head) without a corresponding character. Sub-image selector region 1030 provides a pull-down menu indicating that a female person is selected. A user may select from various categories of images to be designed and/or entered. Sub-image region 1030 also indicates the first of the sub-images to be used. For example, sub-image region 1030 indicates that sub-images of eyes, which are animated, may be selected. The sub-image of eyes may be placed on the face portion of the female person. That is, the sub-image of eyes is an overlay sub-image. In one implementation, when eyes are selected, the next type of sub-image may be provided, such as different animations of a torso (e.g., twisting, using a hola hoop, etc.). In this instance, the sub-image of the torso may be a segment sub-image. So, for example, when a sub-image of eyes is selected, the pull-down menu may indicate that sub-images of a torso may be selected.

In this example, the image/code pair may include a combination of overlay sub-images and segment sub-images. In other instances, the image/code pair may include only overlay sub-images or only segment sub-images.

Additionally, or alternatively, a user may enter a letter and/or a number in code region 1010, without selecting a sub-image. That is, when a user enters a character in code region 1010 the corresponding sub-image is provided in image region 1020.

Although not previously described in reference to FIG. 8 and FIG. 9, it is to be understood that the GUI of image-based code component 410 provides that one or more characters may be entered and the corresponding sub-images may be placed in image region 1020.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while a series of processes and/or acts have been described herein, the order of the processes and/or acts may be modified in other implementations. Further, non-dependent processes and/or acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A non-transitory computer-readable medium containing instructions executable by at least one processor for, the computer-readable medium comprising:
    one or more instructions for providing sub-images;
    one or more instructions for providing sub-image regions;
    one or more instructions for receiving selection of a plurality of sub-images into a plurality of sub-image regions;
    one or more instructions for constructing a first image using the selected sub-images, the first image being part of a unified image;
    one or more instructions for determining whether a sub-image region is occupied;
    one or more instructions for comparing the selected plurality of sub-images with previously selected sub-images in response to determining the sub-image region is occupied; and
    one or more instructions for providing access to at least one of a device, a service, or a function when the selected plurality of sub-images match the previously selected sub-images.

2. The computer-readable medium of claim 1, where the one or more instructions for providing sub-images comprises:
    one or more instructions for categorizing the sub-images.

3. The computer-readable medium of claim 1, where the selected plurality of sub-images includes at least one of two sub-images of different categories or at least one sub-image that is an animation.

4. The computer-readable medium of claim 1, further comprising:
    one or more instructions for generating a code comprising a plurality of characters in response to receiving selection of the plurality of sub-images, where each selected sub-image is associated with each generated character;
    one or more instructions for comparing the generated code with a previously selected code; and
    one or more instructions for providing access to at least one of a device, a service, or a function when the generated code matches the previously selected code.

5. The computer-readable medium of claim 4, where the unified image includes the generated code.

6. The computer-readable medium of claim 1, where the one or more instructions for constructing comprises:
    one or more instructions for overlaying at least one of the selected plurality of sub-images onto at least one other of the selected plurality of sub-images.

7. The computer-readable medium of claim 1, where the selected plurality of sub-images are segments of the first image, and the one or more instructions for constructing comprises:
    one or more instructions for assembling the selected plurality of sub-images to form the first image based on a segmentation of each sub-image.

8. The computer-readable medium of claim 1, where at least one of the selected plurality of sub-images has a plurality of corresponding characters.

9. The computer-readable medium of claim 1, where the one or more instructions for constructing comprises:
    one or more instructions for assembling the selected plurality of sub-images on to corresponding unoccupied sub-image regions.

10. The computer-readable medium of claim 1, where the sub-images include sub-images relating to living things, non-living things, or places.

11. The computer-readable medium of claim 4, where the one or more instructions for constructing comprises:
    one or more instructions for displaying the corresponding characters of the generated code as the plurality of sub-images are selected.

12. A method, comprising:
    providing a computing device processor;
    providing sub-images having a plurality of categories;
    providing sub-image regions on a user interface;
    receiving selection of a plurality of sub-images into a plurality of sub-image regions, each sub-image occupying an unoccupied sub-image region;

constructing a first image that includes the selected plurality of sub-images; displaying the first image in a unified image;

determining whether a sub-image region is occupied;

in response to determining the sub-image region is occupied, comparing, using the computing device processor, information associated with the unified image with information associated with a previously constructed unified image; and providing access to at least one of a device, a service, or a function when the information associated with the unified image matches the information associated with the previously constructed unified image.

13. The method of claim 12, where the receiving selection of comprises:

receiving selection of the plurality of sub-images having at least two sub-images of different categories.

14. The method of claim 12, further comprising:

generating a code comprising a plurality of characters in response to receiving selection of the plurality of sub-images, where each selected sub-image is associated with each generated character, and where the unified image includes the selected plurality of sub-images and the generated code.

15. The method of claim 12, where the receiving selection of comprises:

receiving selection of the plurality of sub-images in response to selection of a plurality of characters associated with the plurality of sub-images.

16. The method of claim 12, where the constructing comprises:

overlaying at least one of the selected plurality of sub-images onto another of the selected plurality of sub-images.

17. The method of claim 14, where the unified image includes a plurality of segments, each segment including a selected sub-image and at least one character of the generated code.

18. The method of claim 12, where the sub-images include animation or video.

19. The method of claim 12, where the constructing comprises:

dragging and dropping a selected sub-image into an unoccupied sub-image region.

20. A device, comprising:

a memory to store instructions; and a processor to execute the instructions to:

receive selection of a plurality of sub-images into a plurality of sub-image regions;

generate a first code comprising a plurality of characters in response to receiving selection of the plurality of sub-images, where each selected sub-image is associated with each generated character;

construct and display a first image that includes the selected plurality of sub-images and the generated first code;

compare the constructed first image with a previously stored image;

compare the generated first code with a previously stored code; and provide access to a function or a service of the device when the received first image matches the previously stored image and the generated first code matches the previously stored code.

21. The device of claim 20, further comprising a display, and the processor executes instructions to display the first image, such that each sub-image of the first image is displayed in an unoccupied sub-image region of the first image and each character of the generated first code is displayed in an unoccupied character region of the first image.

22. A device, comprising:

means for providing sub-images having different categories;

means for receiving selection of a plurality of sub-images;

means for generating a first code comprising a plurality of characters in response to receiving selection of the plurality of sub-images, where each selected sub-image is associated with each generated character;

means for constructing a first image that includes the selected plurality of sub-images;

means for displaying the first image in a unified image;

means for comparing the first image with a previously stored image and the generated first code with a previously stored code; and means for providing access to a function or a service of the device when the first image matches the previously stored image and the generated first code matches the previously stored code.

* * * * *